Patented May 30, 1933

1,911,868

UNITED STATES PATENT OFFICE

HARRY C. YOUNG, OF WOOSTER, OHIO, ASSIGNOR TO THE GRASSELLI CHEMICAL COMPANY, OF CLEVELAND, OHIO, A CORPORATION OF DELAWARE

FUNGICIDE

No Drawing.   Application filed October 1, 1930.  Serial No. 485,822.

The present invention relates to fungicides containing sulfur as the main constituent, besides small amounts of other substances intended to enhance the fungicidal properties of the sulfur.

It has in late years been shown that the beneficial action of sulfur in fighting cryptogamic diseases of plants is mainly, if not entirely due to the presence in minute amounts in the sulfur of oxidation products of the type of polythionic acids.

Oxidation products of this type may already develop when finely divided sulfur as used for fungicidal purposes is stored in contact with air, but I believe that they form to a noticeable extent only when the sulfur is applied to the plants. Conditions existing when sulfur is so applied seem, however, also to favor further oxidation, whereby the polythionic acids are transformed into products which are not effective as fungicides and may even be harmful to the plants. This may explain the irregularities in the control of fungous growths which are sometimes experienced in the application of sulfur dusts.

I have found that the fungicidal action of sulfur can be stabilized if the finely divided sulfur when it adheres as a dust to plants contains admixed with it, small amounts of an amphoteric substance, particularly an inorganic amphoteric compound, and my invention comprises compositions of matter consisting of finely divided sulfur admixed with small amounts of another substance which is of an amphoteric nature when the composition is applied and adheres to the plants as a fungicide.

I believe that the stabilizing effect of an amphoteric substance upon the fungicidal efficiency of sulfur is due to such substances inhibiting the decomposition or further oxidation of the polythionic acid products contained in the sulfur, or developed while the sulfur is in contact with air, moisture and sunlight after its application as a fungicide. While this is the best explanation I can advance for the stabilizing effect of the substances I have added to fungicidal sulfur, it is merely a theory, and I wish it to be understood that my invention is not limited by any such theory or explanation.

I also found that it is unnecessary to admix with the sulfur a substance which is already amphoteric when compounded therewith. Just as the effective fungicidal effect develops mainly when the sulfur dust adheres to the plants, it is also only necessary that the amphoteric substances be present at the time of the formation of these polythionic acids. There are certain substances which under the conditions existing when sulfur is applied as a fungicide and adheres to the plant parts, will be so modified by the plant juices, humidity of the air, etc., as to exhibit amphoteric character, and such substances were found by me to be just as effective stabilizing agents as substances which are already amphoteric when mixed primarily with the sulfur.

Aluminum and zinc hydroxide and the corresponding uncalcined oxides and basic salts are among the primary amphoteric substances found by me to be most effective in stabilizing fungicidal sulfur. Among the substances which are not amphoteric per se, which I believe owe their stabilizing effect upon fungicidal sulfur to a transformation into amphoteric substances at the time of application of the sulfur compositions, are salts of zinc and aluminum, in which zinc and aluminum as the positive ions. These salts are normally strongly hydrolized in contact with water, and the hydroxides formed are true amphoteric substances.

In addition to their chemical characteristics the amphoteric substances useful in my novel compositions should also have certain other properties; they should be non-hygroscopic and liable to be ground to a very fine powder. Dry aluminum sulfate and dry zinc sulfate conform well to these requirements. These salts, as well as dry zinc or aluminum hydroxide, oxides or their basic salts can be easily ground to a fineness of 200 or 300 mesh, similar to the fineness of fungicidal sulfur.

I have further found that the inorganic substances which I incorporate according to my invention into sulfur dusts improve the adhesiveness of the dust on the plant parts, which feature also helps to improve control of fungous diseases obtainable by my novel fungicide.

The amounts of substance of the nature disclosed required to stabilize the fungicidal effect of dusting sulfur is of the order of a few per cent, figured on the content of sulfur in the fungicide. A composition consisting of 95% dusting sulfur and 5% by weight of either of the following dry and finely ground substances: aluminum hydroxide, zinc oxide, or hydroxide, aluminum sulfate or zinc sulfate, or the basic sulfates of these metals, or other non-hygroscopic salts formed from an anion, the hydroxide of which is amphoteric, etc., was found to be much superior to straight sulfur dusts, and at least equal to the most efficient lime-sulfur liquid sprays without having any of the drawbacks of the latter. The absolute amount of the amphoteric substance contained in my novel dusting sulfur is not critical at all; less than 1% is in many instances sufficient to stabilize the fungicidal effect of the sulfur. Incorporation of excessive amounts of an amphoteric substance should be avoided, as the sulfur would thereby be unduly diluted and the composition would be more expensive without having any additional value over similar dusts made with lesser amounts of the amphoteric substance. The amount of 5%, stated above, was found empirically to safely insure the beneficial effect in all instances without undue dilution.

My novel compositions are particularly intended for use as dusts on fruit trees and flower plants.

Excellent control has, for instance, been obtained by my novel dusts on black spot and mildew on roses. Apple scab and peach leaf curl have likewise been successfully controlled by applications of dusts, comprising dusting sulfur and an inorganic substance which is of an amphoteric nature, when said composition is applied as a dust to plants.

The application of my novel dusts to plants is made in the usual manner and as the mode of application will vary with the season, weather conditions, and depends upon so many factors well known to the horticulturists, it does no need to be described in detail herein.

I claim:

1. As a composition of matter a dusting fungicide consisting of sulfur and small amounts of a substance selected from the group of substances consisting of the precipitated, uncalcined oxides and hydroxides, the basic salts, and the non-hygroscopic salts of metals, the hydroxides of which are of an amphoteric nature.

2. As a composition of matter a dusting fungicide consisting of sulfur and small amounts of a substance selected from the group of substances consisting of the precipitated, uncalcined oxides, hydroxides, the basic salts and the non-hygroscopic salts, in which zinc and aluminum are the anion, of zinc and aluminum.

3. As a composition of matter a dusting fungicide consisting of sulfur and a small amount of dry, finely ground aluminum sulfate.

4. As a composition of matter a dusting fungicide consisting of sulfur and a small amount of dry, finely ground zinc sulfate.

5. As a composition of matter a dusting fungicide consisting of sulfur and a small amount of dry, finely ground precipitated aluminum hydroxide.

6. A dry composition of matter consisting of finely divided sulfur and small amounts of an inorganic, non-hygroscopic, amphoteric substance, intimately admixed therewith.

In testimony whereof, I affix my signature.

HARRY C. YOUNG.